United States Patent [19]

Richard et al.

[11] 4,004,089
[45] Jan. 18, 1977

[54] PROGRAMMABLE CRYPTIC DEVICE FOR ENCIPHERING AND DECIPHERING DATA

[75] Inventors: Harold S. Richard, Dayton; Eugene L. Grillmeier, Centerville; Jack R. Gross, Waynesville; Robert P. Myers, Kettering, all of Ohio

[73] Assignee: NCR Corporation, Dayton, Ohio

[22] Filed: Feb. 28, 1975

[21] Appl. No.: 553,955

[52] U.S. Cl. .............................. 178/22; 340/149 A
[51] Int. Cl.² ................................................ H04L 9/00
[58] Field of Search ... 178/22; 340/149 A, 146.1 A; 331/78

[56] References Cited
UNITED STATES PATENTS

| | | | |
|---|---|---|---|
| 3,522,374 | 7/1970 | Abrahamsen et al. | 178/22 |
| 3,657,699 | 4/1972 | Rocher et al. | 178/22 |
| 3,731,197 | 5/1973 | Clark | 178/22 |
| 3,773,977 | 11/1973 | Guanella | 178/22 |
| 3,781,473 | 12/1973 | Goode et al. | 178/22 |
| 3,798,359 | 3/1974 | Feistel | 178/22 |
| 3,798,360 | 3/1974 | Feistel | 178/22 |
| 3,824,467 | 7/1974 | French | 178/22 |
| 3,911,216 | 10/1975 | Bartek et al. | 178/22 |

Primary Examiner—Howard A. Birmiel
Attorney, Agent, or Firm—J. T. Cavender; Albert L. Sessler, Jr.; Edward Dugas

[57] ABSTRACT

An encrypter for encoding and decoding data, wherein clear text data to be encoded is logically combined with a portion of a non-linear pseudo-random bit sequence signal to provide a partially encoded signal. The bit sequence of the non-linear pseudo-random signal is chosen in accordance with a user selected key. A shuffle register receives the partially encoded signal and interchanges the positions of the bits making up the partially encoded signal in accordance with a user selected key to provide the fully encoded signal. The fully encoded signal may then be recorded, for example, on the magnetic stripe of a credit card.

Means are provided for decoding the above described encoded signal using the same portion of the nonlinear pseudo-random bit sequence that was used for encoding.

6 Claims, 8 Drawing Figures

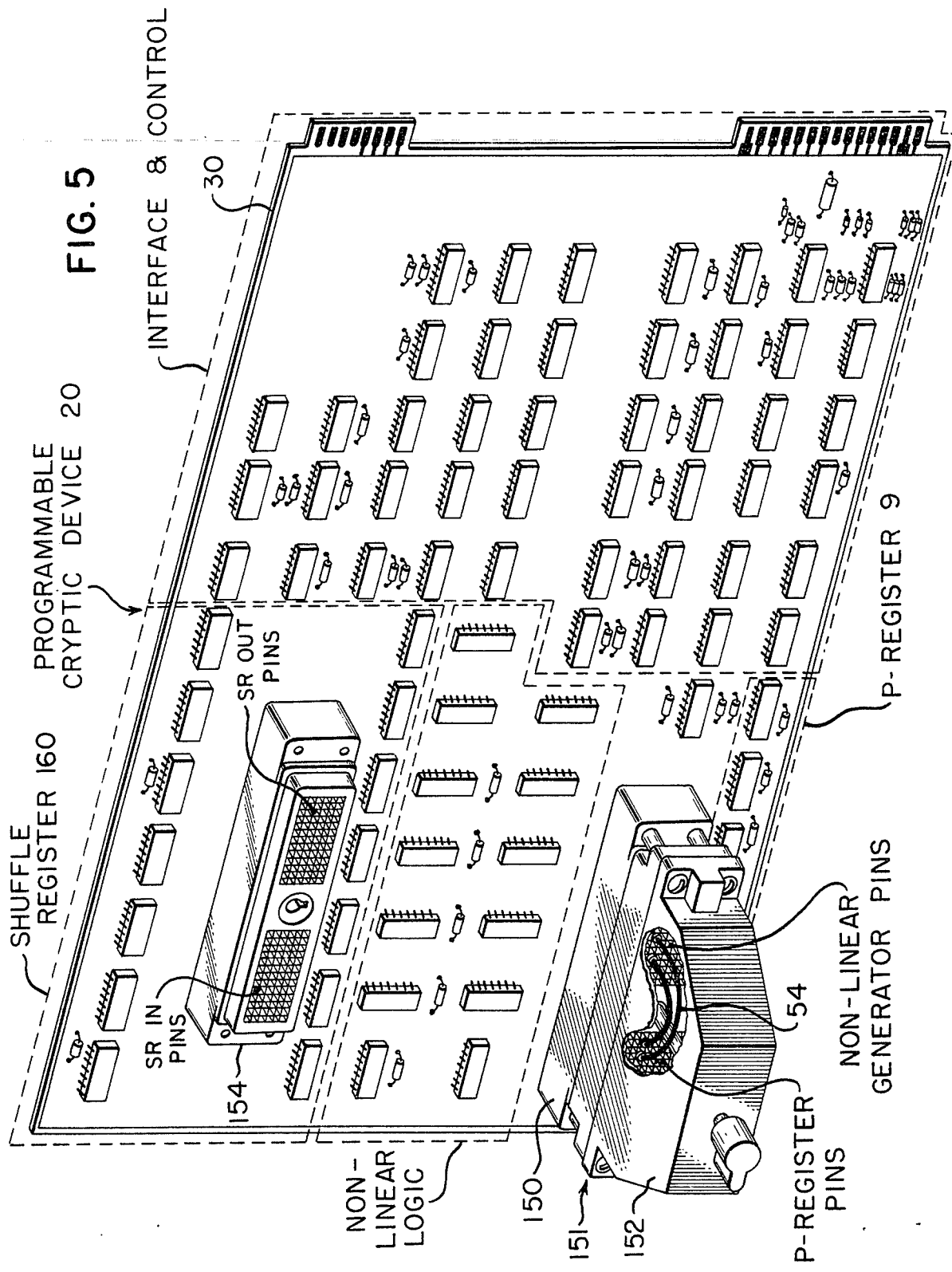

PROGRAMMABLE CRYPTIC DEVICE FOR ENCIPHERING AND DECIPHERING DATA

BACKGROUND OF THE INVENTION

The invention relates to cryptic devices and more particularly to a cryptic device for encoding and decoding a data signal in accordance with user selected keys.

Remote terminal banking, of the type which utilizes automatic teller machines and credit card automatic currency dispensers, utilizes credit cards which have magnetically encoded stripes of data positioned on a surface of the card. The data is encoded in such a manner as to make alteration of the encoded data difficult. A number of prior art machines utilize a temporary code, that is, each time the card is read by the machine the old code is removed and a new code substituted. Scrambling of the code with a changing key helps to minimize unauthorized access to the currency dispensing machines.

A prior art patent of interest is U.S. Pat. No. 3,662,343 entitled "Credit Card Automatic Currency Dispenser", by K. S. Goldstein et al. In operation, the scrambling device used in the reference patent encodes the clear text data by dividing the complete code phrase into fixed-length words. Empty spaces in a fixed-length word are filled with random letters. The fixed-length words are then transported according to a transposition key. Next a character substitution is performed, for example, by replacing each letter by the next letter in alphabetical order. Finally the letters of each of the word groups are transposed according to a character transposition key. The end result of this scrambling is to provide a system code which has a probability of being broken of $3\times10^{16}$.

Another prior art technique for cryptically encoding is disclosed in U.S. Pat. No. 3,506,783 entitled "Key Material Generator" by I. Mo et al. and U.S. Pat. No. 3,522,374 entitled "Ciphering Unit" by P. R. Abrahamsen et al. Both of these patents disclose a pseudo-random key generator for generating a long sequence of non-linear pseudo-random bits. Clear text data is modulo-two added to a portion of the pseudo-random key signal to provide the encoded signal. The pseudo-random key generator utilizes a plurality of shift registers with non-linear feedback circuits. The long sequence of random bits is produced by selecting, by means of pins on a pinboard, certain outputs from each of the plurality of shift registers.

Encoding techniques which utilize a long sequence linear pseudo-random key as the sole means of encoding were believed to be reasonably secure from unauthorized decoding, but it has recently been discovered that if a string of encoded data of sufficient length could be obtained then the long sequence, linear pseudo-random key could be determined by a mathematical attack or a cipher text analysis.

To prevent or minimize the possibility of such a determination the present invention utilizes both a bit substitution process and a bit transposition process. In the present invention the bit outputs from a plurality of linear shift registers are combined in a non-linear sequence generator to provide a bit substitution signal which signal is a long, non-linear pseudo-random sequence bit signal. The bit outputs from the plurality of linear shift registers are programmably combined in the non-linear sequence generator according to a first program key. The bit substitution signal is then logically combined with the clear text data signal to provide a partially encoded signal. A bit shuffler then shuffles the position of the bits in the partially encoded signal so as to perform the bit transposition process, and to provide the completely encoded signal. The shuffle position of the bit is programmably controlled in the shuffle register according to a second program key. The "layering" of a bit substitution process with a bit transposition process without making the intermediate results known makes key recovery by mathematical attack or by cipher text analysis so time consuming that the key configuration would probably have been changed in the interim. The intent, of course, is to make the only possible approach to decoding be by trial and error, and then make the number of trials required astronomical.

A target was selected such that if one key configuration were tried every microsecond for 10 years there should be less than one change in a million of having tried the correct configuration. If this goal could be met, it was assumed that the enciphering mechanism would be sufficiently complex for the needs of an automatic teller terminal. There are $3.1536 \times 10^{14}$ microseconds in 10 years. If the number of possible key configurations were greater than $3.2 \times 10^{20}$ the goal would be achieved.

In the preferred embodiment of the present invention the encrypter uses a 16 bit linear shift register with a random synchronizing configuration. This provides $6.5535 \times 10^4$ possible starting configurations. The shift register is used in conjunction with one or more non-linear sequence generators whose input connections are (programmed) user selected. There are $16!/(2! \times 7!)$ or $2.07 \times 10^9$ possible configurations of the inputs to each non-linear sequence generator. Finally, the message is segmented into 56 bit blocks and these bits are shuffled (programmed) by user selection. This provides $28! \times 2^{28}$ or $8.18 \times 10^{37}$ possible shuffle configurations. Multiplying $6.5535 \times 10^4 \times 2.07 \times 10^9 \times 8.18 \times 10^{37}$ equals $1.11 \times 10^{52}$ total possible configurations. This far surpasses the necessary target complexity.

SUMMARY OF THE INVENTION

Although the cryptic device of the present invention is described in the environment of automatic teller machines of the type which use magnetic stripe credit cards it is to be appreciated that the cryptic device of the present invention may be used to encode/decode a string of data without limitations as to use of the data.

In a preferred embodiment of the present invention means are provided for generating a non-linear pseudo-random bit sequence in accordance with a preselected user key. Means are provided for combining the generated non-linear pseudo-random bit sequence with a clear text data bit signal to provide a partially encoded signal.

A shuffling means receives the partially encoded signal and shuffles the positions of the bits within the partially encoded signal in accordance with a preselected user key to provide the completely encoded signal. The encoded signal may then be recorded on a credit card.

Decoding of the completely encoded signal is accomplished by reversing the procedure of the encoding.

In the preferred embodiment of the invention, means are provided for generating more than one non-linear pseudo-random sequence, so as to enable the use of two or more issues of credit cards. With the reading of the code on a credit card, the old code is removed and a new code is substituted. The new code may be encoding the same information or updated information. The number of user programmable combinations that may be achieved with the present invention is so large as to make the probability of breaking the code extremely small.

Accordingly, it is a primary object of the present invention to provide an improved data encrypter.

It is a further object to provide a data encrypyter which can be easily programmed by a user while providing maximum security.

It is another object of the present invention to provide a data encrypter which insures maximum security of the encoded data.

It is still another object of the present invention to provide an encrypter which may be used by a large number of institutions without duplication of codes.

These and other objects of the present invention will become more apparent when taken in conjunction with the following description and drawings wherein like characters indicate like parts and which drawings form a part of the present invention.

BRIEF DESCRIPTION OF THE DRAWINGS

FIG. 5 is a perspective view of the cryptic device of the present invention positioned on a plug-in type board.

DESCRIPTION OF THE PREFERRED EMBODIMENT OF THE INVENTION

Figure 1:
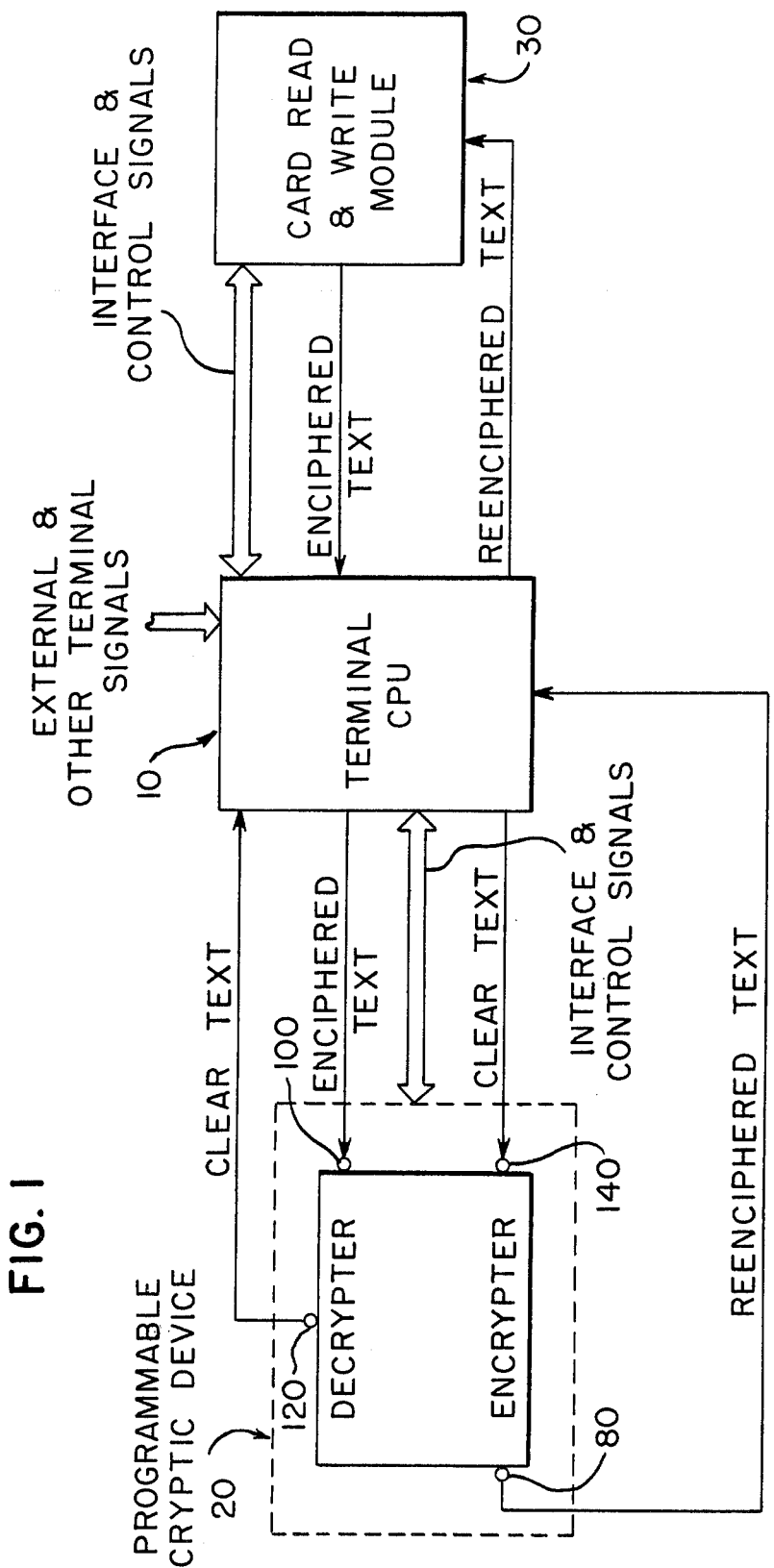
FIG. 1 is a block diagram illustrating the interfacing between the ciphering device of the present invention and the CPU of a teller terminal of the type which is activated by a credit card.

In FIG. 1 the major components of a system such as a teller terminal are shown interfaced with the programmable cryptic device 20, of the present invention. A credit card read and write module 30 can be used to read the magnetic stripe of a credit card to provide an enciphered text data signal to the terminal central processing unit (CPU) 10. Not all of the data read from the magnetic stripe of the credit card need be enciphered, only that data which is to be maintained as confidential. The CPU also receives and sends interface and control signals from the cryptic device, the card read and write module, and other terminal devices to enable the various sections. The CPU 10 directs the enciphered text to the decrypting section, terminal 100, of the programmable cryptic device 20 for decoding. The decoded data is designated clear text. The clear text data which appears at terminal 120 of the cryptic device 20 is fed back to the CPU for processing. Processing may, for example, consist of checking a customer's identification code and account number, card expiration date, number of allowed uses in a day, and date of last use. Certain portions of the clear text data may remain unchanged regardless of the number of times that the card is used, while other portions of the clear text data are updated to reflect customer use. The CPU, upon completing the update to the clear text data, directs the updated clear text to the encrypter portion of the programmable cryptic device, via terminal 140, wherein the updated clear text data is re-enciphered using a changing key. The re-enciphered signal is then fed from terminal 80, to the card read and write module 30, via the CPU.

P-REGISTER

Figure 2A:
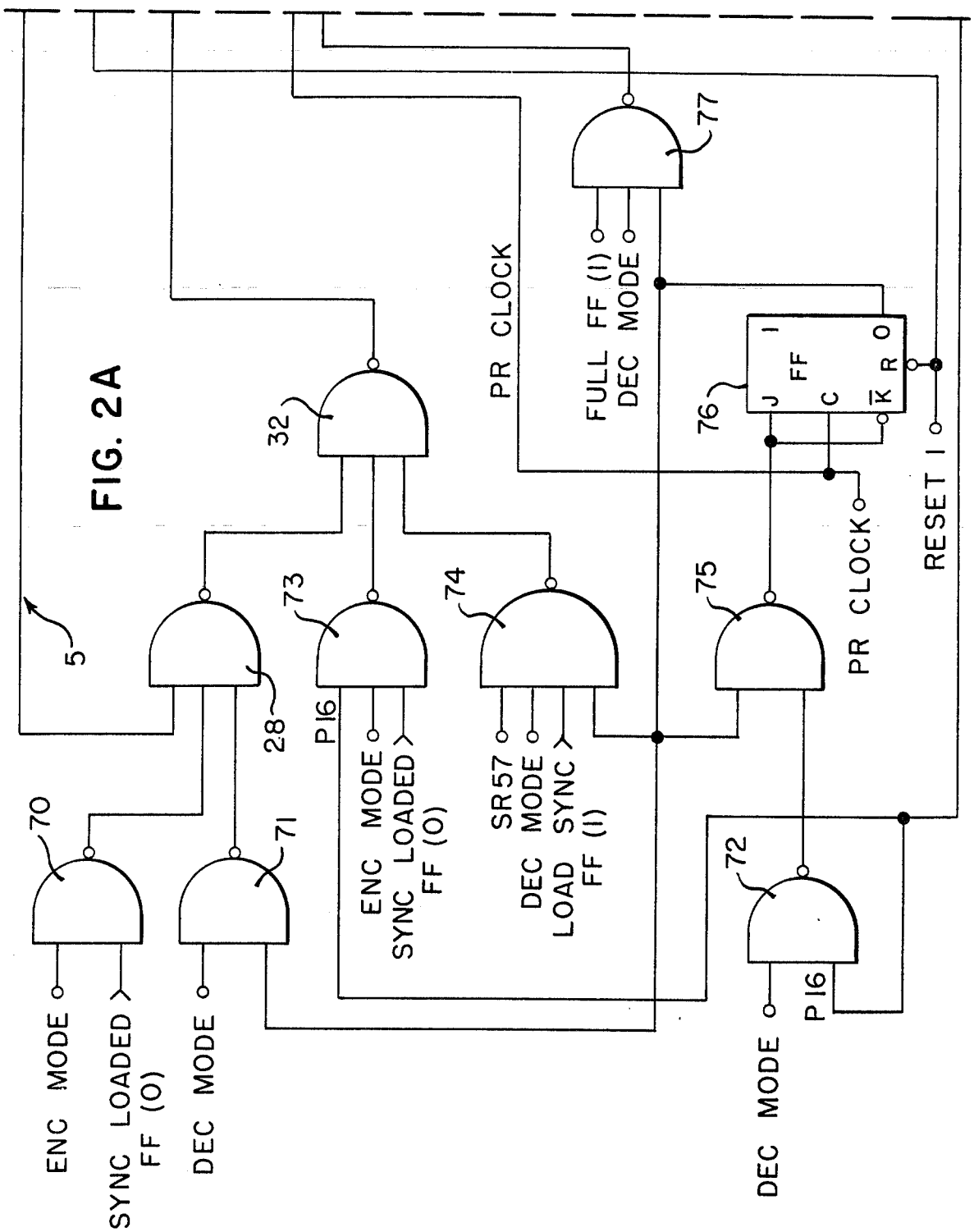
FIGS. 2A and 2B are a schematic block diagram of the pseudo-random sequence generator with a portion of its interface and control logic.
Figure 2B:
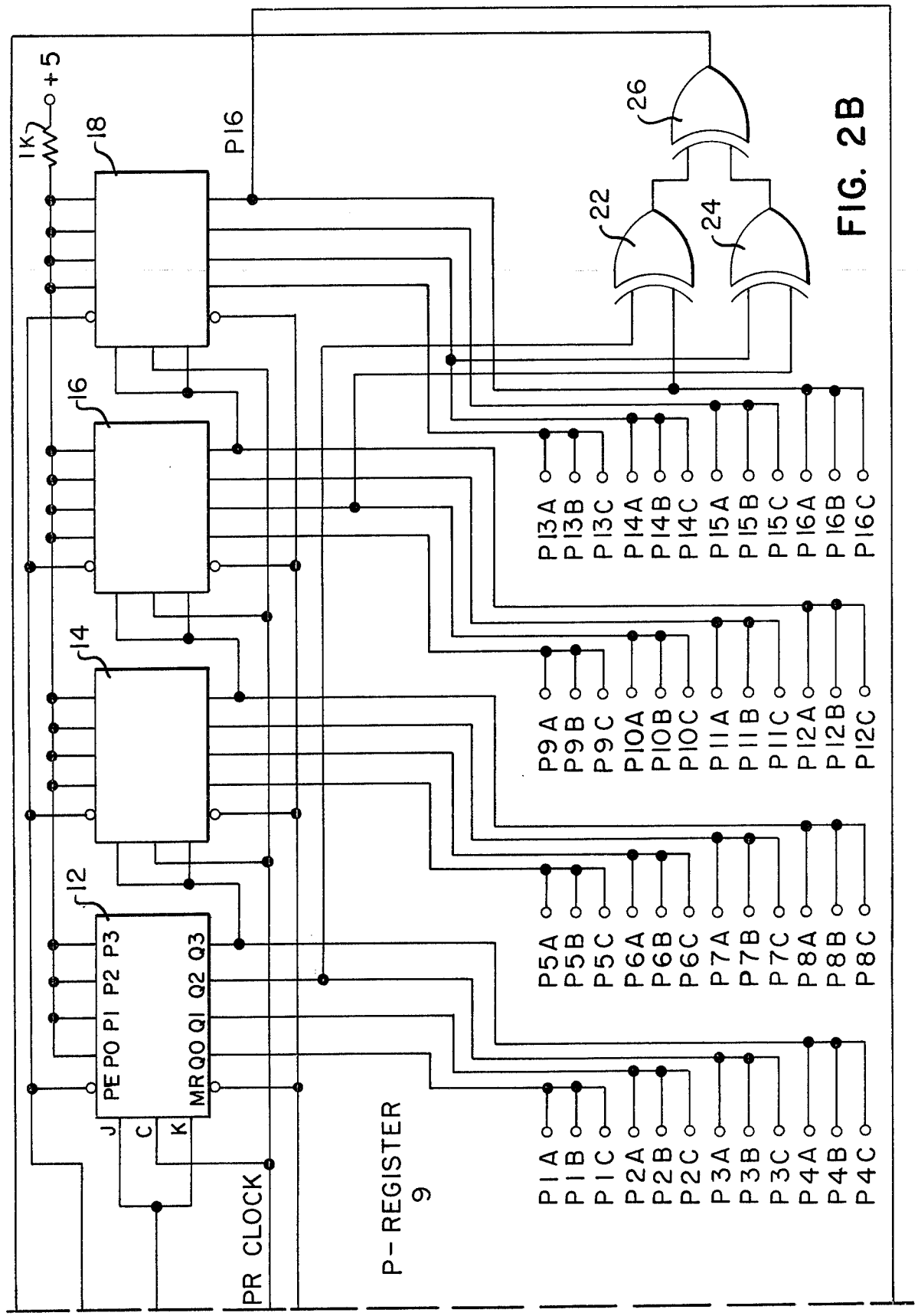

In FIGS. 2A and 2B the P-Register 9 for generating a maximal length linear pseudo-random bit sequence is shown.

Four shift registers 12, 14, 16 and 18 are serially connected to comprise the P-Register such that the bit signal present at the last stage of one shift register is used as the input signal for a succeeding stage. In the preferred embodiment of the invention, each shift register used is a 4-bit universal shift register pack, of the type manufactured by FAIRCHILD INC. and bearing the part No. 9300. Each of the shift registers contains one flip-flop stage per bit. The output of each flip-flop stage of a shift register is connected to three pin connections labeled, in part, A, B and C. For example, the Q0 output of shift register 12 is connected to three pins labeled P1A, P1B and P1C. The remaining shift register outputs are connected as shown with the last, or Q3 output of shift register 18 being connected to the three pins labeled P16A, P16B and P16C. Each of the pins P1A to P16C is positioned within a connector 150, shown in FIG. 5. The P-Register is mechanized to produce a maximum length bit sequence by exclusive-ORing selected Q outputs of selected registers and feeding the result back into the input of the first shift register so as to produce the maximum length bit sequence. With a 16 bit shift register (result of serially connecting four four-bit shift registers) a maximal length sequence is defined as a 65,535 ($2^{16}-1$) bit sequence where no one 16 bit segment is repeated within that sequence. In the embodiment shown, the Q2 output of shift register 12 is connected to an input of the EXCLUSIVE-OR gate 22. The other input to the EXCLUSIVE-OR gate 22 is connected to the Q3 output of shift register 18. The EXCLUSIVE-OR gate 24 has one input connected to the Q1 output of shift register 18 and the other input connected to the Q1 output of shift register 16. The particular connections shown for the gates 22 and 24 are by way of example only, and other combinations of connections may be used to provide a particular bit sequence. The outputs of the EXCLUSIVE-OR gates 22 and 24 are connected to the inputs of an EXCLUSIVE-OR gate 26. The output of EXCLUSIVE-OR gate 26 is connected to the J and K inputs of shift register 12 through the feedback path 5 which includes NAND gates 28 and 32.

The P0 to P3 inputs of each of the shift registers 12, 14, 16 and 18 are connected to a +5 voltage supply by means of a 1k resistor to maintain these inputs at a high (1) logic level. Throughout this description a high denotes a logic level 1 and a low denotes a logic level 0. The PE (Parallel Enable) input of each shift register is connected to a RESET 1 terminal. All the C (CLOCK) inputs of the shift registers are connected to a PR CLOCK terminal. When power is first applied to the cryptic device, or upon completion of enciphering or deciphering a message, all flip-flops in the P-Register are conditioned to a 1 state by the application of a low logic level signal to the RESET 1 terminal. At the rise of the next PR CLOCK PULSE all flip-flops in the P-Register are set. The logic level of the signal applied to the RESET 1 terminal is then switched high to condition the PE inputs of the shift registers for serial operation. Successive PR CLOCKS then result in a "free-run" serial mode of operation wherein the bit signal from the output of EXCLUSIVE-OR gate 26 is fed to the input of shift register 12 and clocked through each stage of the P-Register at the PR clock rate. The P-Register thus generates a maximal length linear pseudo-random bit sequence signal. At any instance in time, 16 bits of the sequence will appear at corresponding labeled terminals, P1A to P16C.

The PR CLOCK and other clock signals, which are mentioned in the following description, control the flow of data through the cryptic device. The generation of clock signals is well known in the art and will not be described in detail herein since any one of many known approaches could be used. The functions of the various clock signals will be described where needed to provide a clear understanding of the operation of the preferred embodiments of the invention.

NON-LINEAR SEQUENCE GENERATORS

Figure 3A:
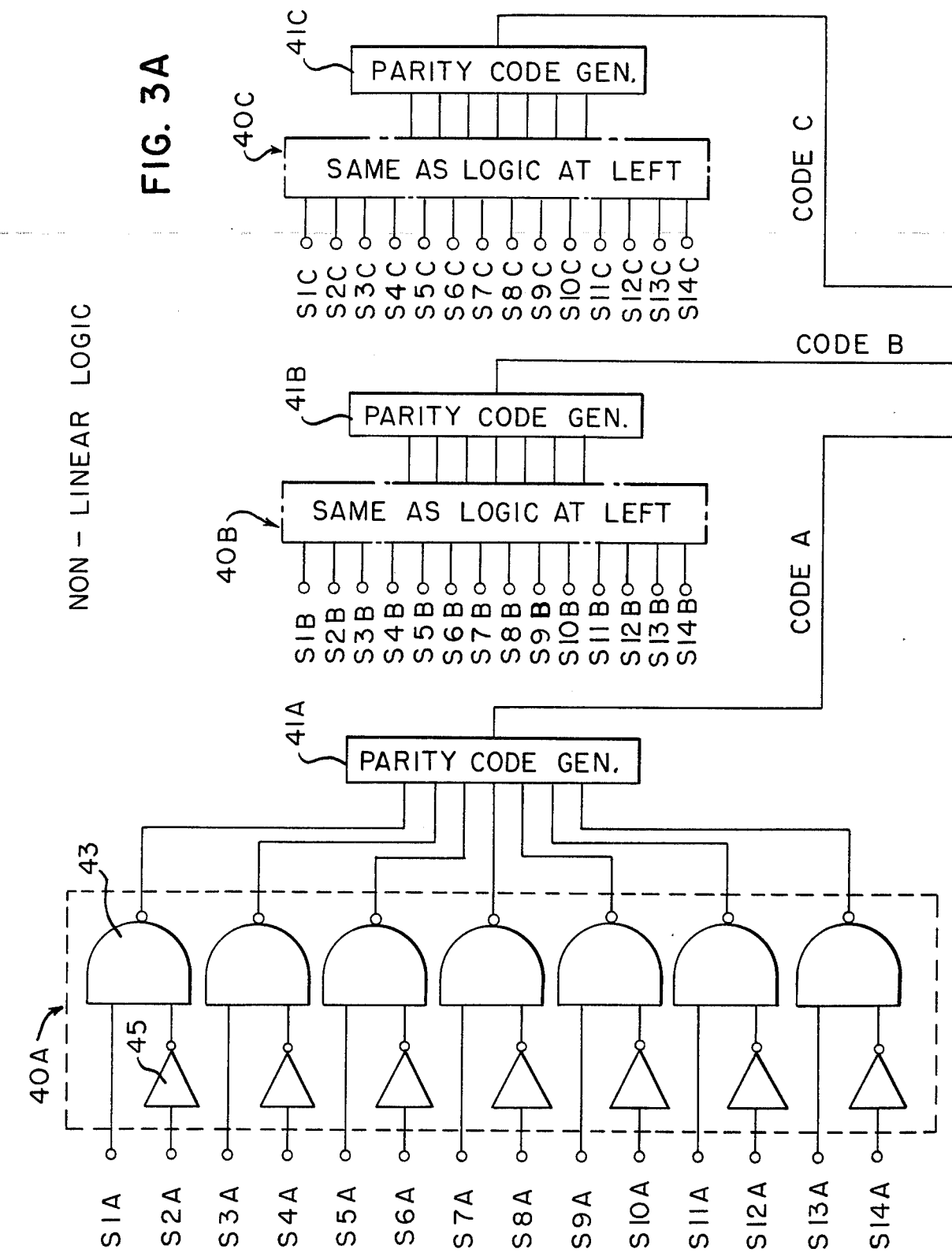
FIGS. 3A and 3B are a schematic block diagram of non-linear logic generators that can be used with the pseudo-random sequence generator of FIGS. 2A and 2B along with a portion of its interface and control logic.
Figure 3B:
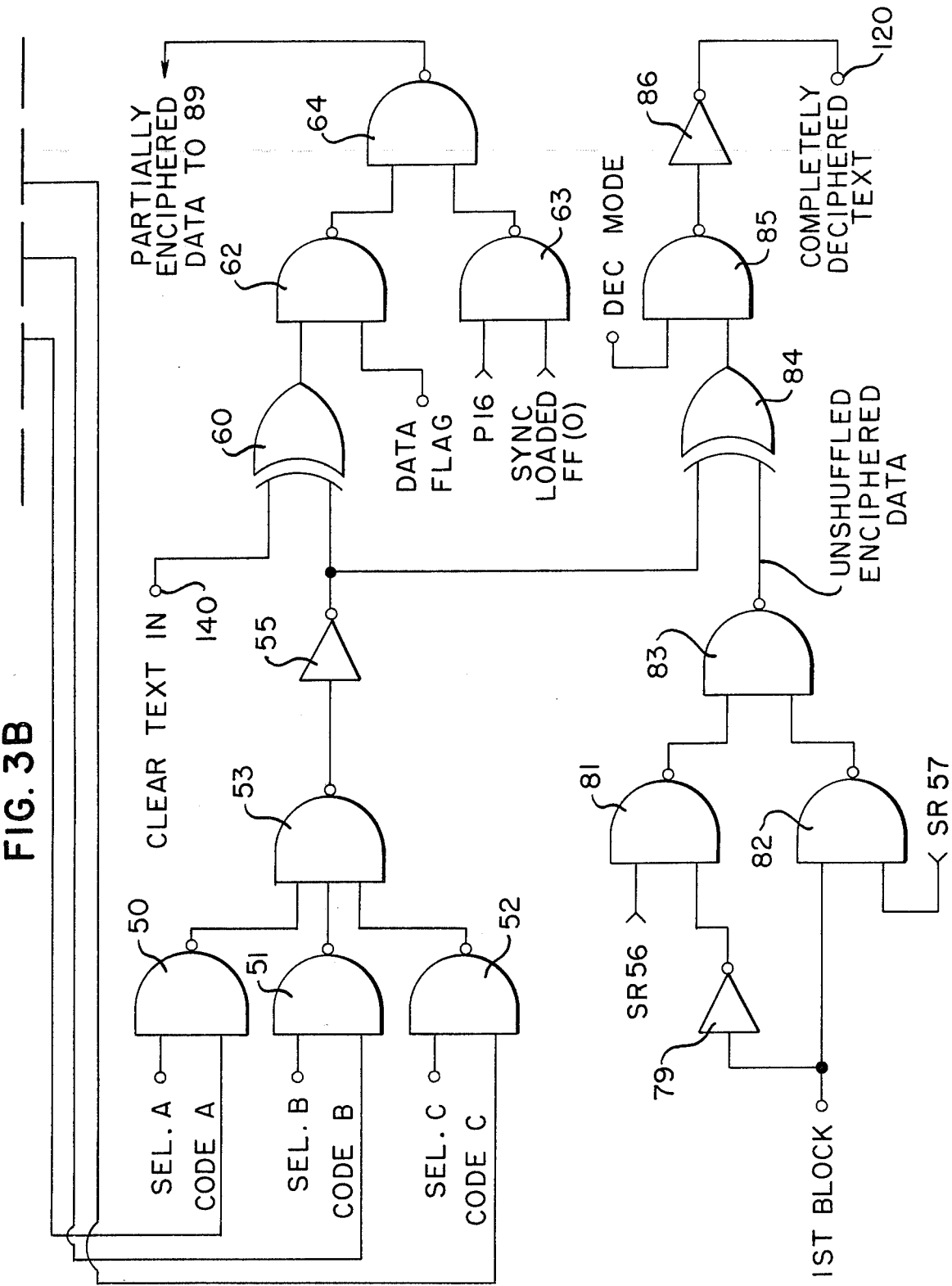

In FIGS. 3A and 3B, there are shown three non-linear sequence generators each comprised of a logic section 40 and a parity generator 41. These sequence generators convert the linear pseudo-random bit sequence signal generated by the P-Register 9 into three separate non-linear pseudo-random bit sequences designated CODE A, CODE B and CODE C. Only one non-linear sequence generator is required to generate a particular sequence. The two additional sequence generators provide additional versatility in that different sequences can be used for example for different issues of credit cards.

Each of the non-linear sequence generators are identical in construction utilizing seven inverters 45, seven NAND gates 43, and a parity generator 41. The input to each inverter 45 is connected to an individual even-numbered pin receptacle S. One input of each NAND gate 43 is connected to an individual odd-numbered pin receptacle S. The output of each inverter 45 is connected to the other input of an associated NAND gate 43. The pin receptacles are labeled S1A to S14A for the generator 40A, S1B to S14B for the generator 40B, and S1C to S14C for the generator 40C. The outputs of each of the seven NAND gates 43 of a sequence generator are connected to the inputs of an associated parity generator 41. The parity generators are mechanized such that an even number of the seven input lines being at the 1 logic level produces a 0 logic level output and an odd number of 1 logic levels produces a 1 logic level output.

Referring momentarily to FIG. 5, each of the pin receptacles associated with the non-linear sequence generators of FIG. 3 are positioned within the receptacle portion 150 of a programmable security connector 151. The plug portion 152 of connector 151 contains a plurality of jumpers 54 each of which is used to interconnect a particular P-pin connector from the P-Register to a particular S-pin connector of a non-linear sequence generator. For example, to program the non-linear pseudo-random sequence key, a jumper is connected from the P1A pin connection of shift register 12 to any selected input pin connection of the non-linear logic circuit 40A, for example pin S14A. As each of the three non-linear sequence generators has 14 inputs, a total of 42 jumpers are used. Six of the P-register output pins are not used.

Referring back to FIGS. 3A and 3B, the output signals (CODE A, CODE B and CODE C) from the parity generators 41A, 41B and 41C are directed to an input of NAND gates 50, 51 and 52 respectively. Each NAND gate 50, 51 and 52 has its other input connected to a SEL line. The desired bit train, CODE A, CODE B or CODE C, is selected by applying a 1 level signal to the appropriate SEL line. The outputs of NAND gates 50, 51 and 52 are connected to the inputs of NAND gate 53. The output of NAND gate 53 is inverted by inverter 55 and applied to the input of the EXCLUSIVE-OR gate 60. The output signal from inverter 55 will be one of the three selected non-linear pseudo-random bit train signals. The other input to the EXCLUSIVE-OR gate 60 will be the clear text signal, which signal will be partially enciphered by exclusive-ORing the clear text signal, bit by bit, with the non-linear pseudo-random bit train signal.

The NAND gates 62, 63 and 64 control the gating of the partially enciphered data to the output of NAND gate 64. A DATA FLAG input signal to NAND gate 62 controls the gating of the partially enciphered data to the input of NAND gate 64. A SYNC. LOADED FF input to NAND gate 63 controls the gating of the signal P16, from the last stage of the shift register 18 (FIG. 2), to the input of NAND gate 64. The operation of these signals will be described in more detail under the portion of the Description entitled, DESCRIPTION OF INTERFACE AND CONTROL CIRCUITS WITH OVERALL SYSTEM OPERATION.

SHUFFLE REGISTER

Figure 4A:
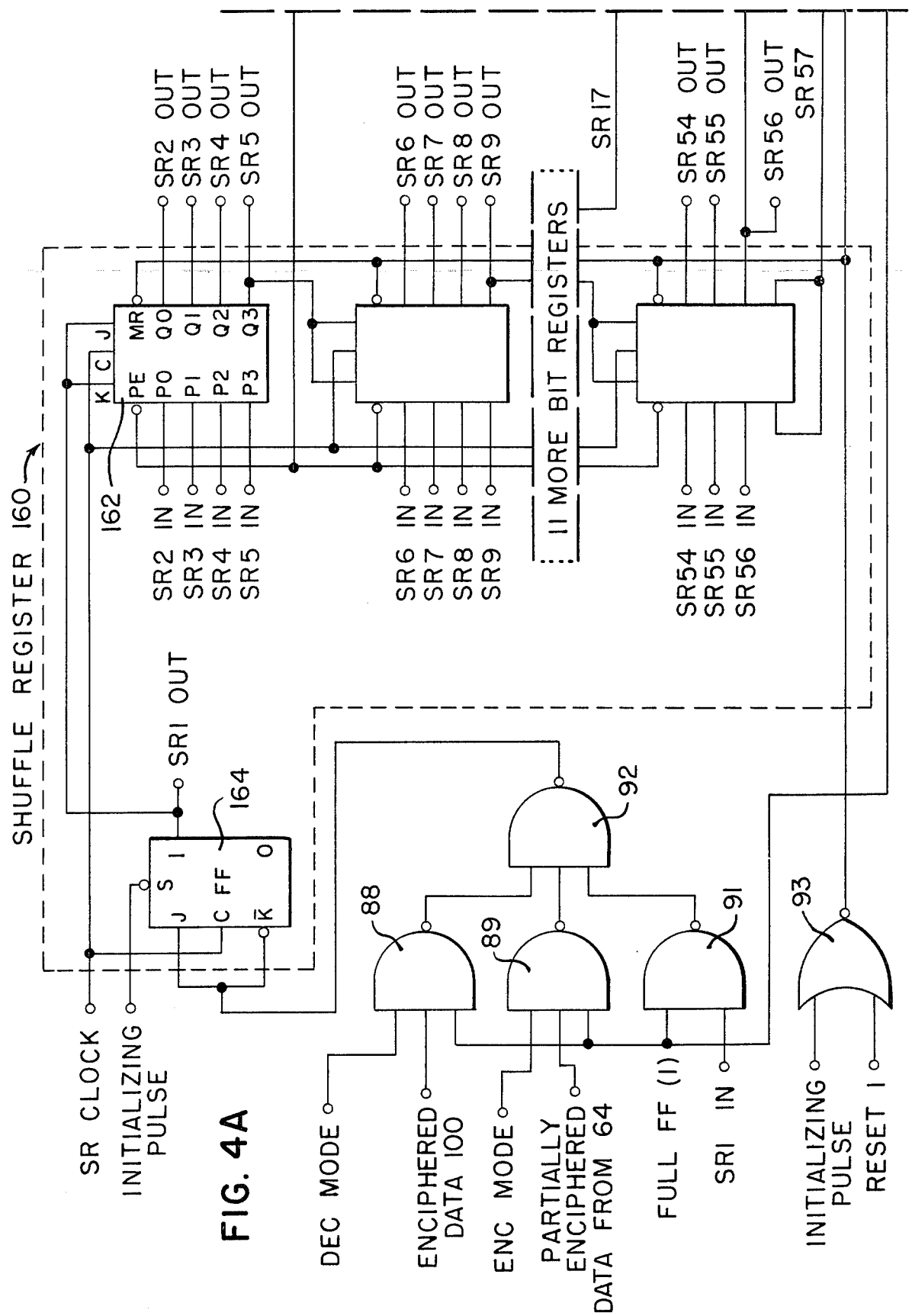
FIGS. 4A and 4B are a schematic block diagram of a shuffle register along with a portion of its interface and control logic.
Figure 4B:
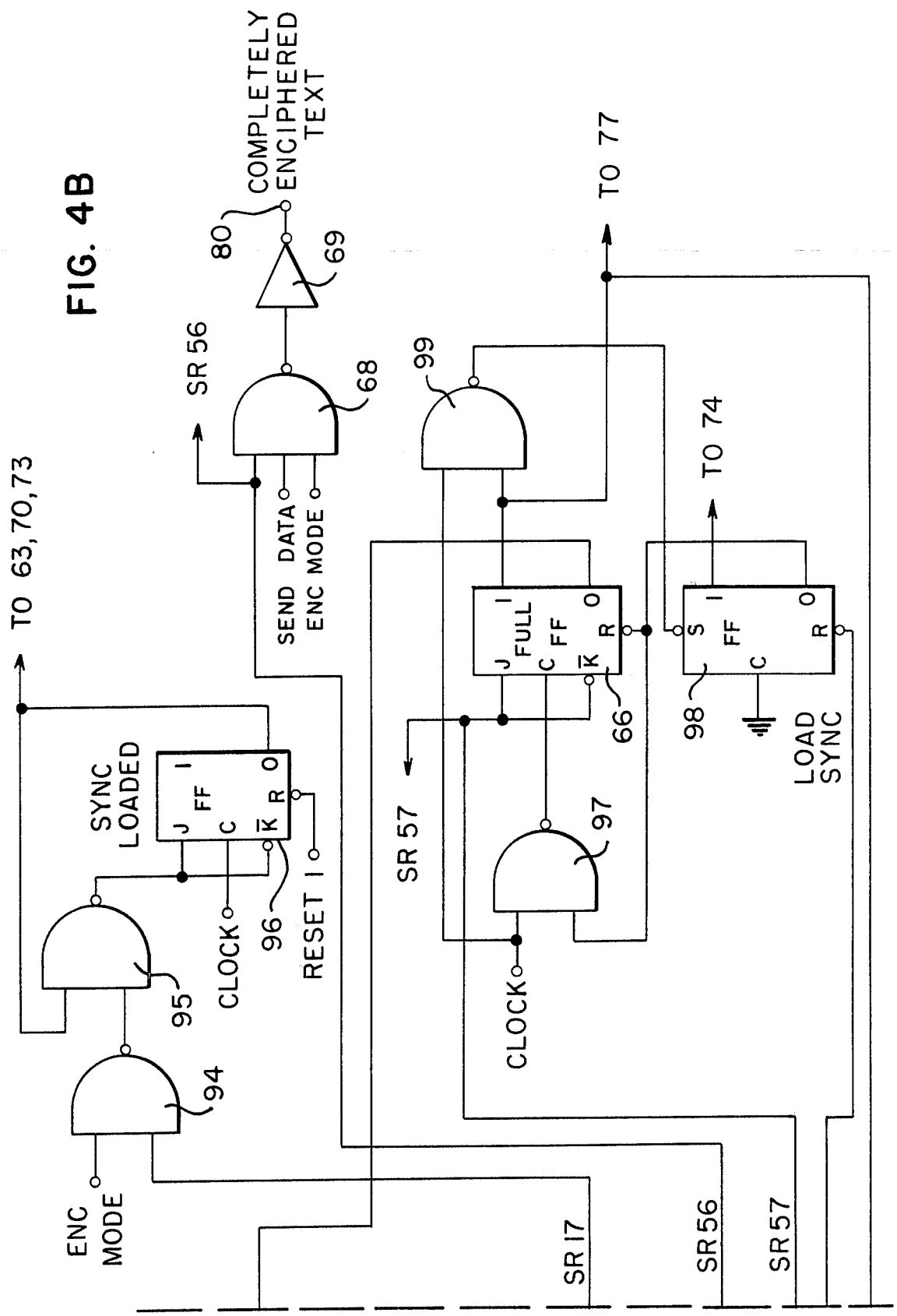

Referring to FIGS. 4A and 4B, the Shuffle Register 160 is comprised of fourteen four-bit universal shift registers 162, and one flip-flop 164 to provide a total of 57 bit positions. In the preferred embodiments of the invention each of the individual flip-flops used is of the type manufactured by FAIRCHILD INC. bearing the part No. 9024. Each SR IN pin and SR OUT pin of the fourteen shift registers is positioned in the receptacle portion 154 of a second programmable security connector, (FIG. 5). A mating plug, similar to plug 152, interconnects with the receptacle portion 154. Jumper wires positioned within the mating plug connect selected input terminals, SR, IN, to selected output terminals, SR OUT, to provide a bit interchange. The position of 56 jumper wires in the mating plug determines the bit interchange. As an example, to interchange bit positions 2 and 54, output pin SR2 is connected to input pin SR54 and output pin SR54 is connected to input pin SR2. Similarly, to interchange bit positions 4 and 9, output pin SR4 is connected to input pin SR9 and output pin SR9 is connected to input pin SR4. This procedure is repeated until a total of 28 bit interchanges have been programmed.

The PE (Parallel Enable) inputs of the 14 four-bit registers 162 are connected to the 0 output of the FULL flip-flop 66.

An SR CLOCK signal is applied to the C inputs of each of the registers 162. The K and J inputs of the first register are connected to the 1 output of flip-flop 164. The K and J inputs of each succeeding register are connected to the Q3 output of each preceding register. The output of the 14th shift register (57th bit position) is connected to its own input, to the input of the FULL flip-flop 66 and to the input of a NAND gate 74 (FIG. 2A). When the FULL flip-flop 66 is set, the Shuffle Register 160 is in a parallel mode of operation. The rise of an SR CLOCK will result in the levels (0 or 1) present at the inputs SR1 through SR56 being gated into the Shuffle Register. Thus a bit interchange will occur. Since the Shuffle Register capacity is fixed at 56 bits, all information is processed in blocks of 56 bits. When the FULL flip-flop is reset, the Shuffle Register 160 is placed in a serial mode of operation and the rise of each successive SR CLOCK will result in the contents of the Shuffle Register being shifted one bit position, for example, bit position 56 will assume the state of bit position 55. The completely enciphered text signal appears, bit by bit, at position SR56, and is gated to the output terminal 80 by means of a NAND gate 68 and an inverter 69.

In a cursory summary of the foregoing description, a maximal length linear pseudo-random bit sequence is generated using a P-Shift Register with feedback. Non-linear logic circuits are connected by a first programmable security connector to selected stages of the P-Shift Register to provide a unique maximal length non-linear pseudo-random bit sequence. This signal is then exclusive-ORed with a clear text signal on a bit-by-bit basis to partially encipher the clear text signal. The aforementioned partially enciphered bit sequence is further encoded in a Shuffle Register wherein a second programmable security connector is used to exchange bit positions from one stage of the Shuffle Register to another stage to provide the totally enciphered clear text sequence. Due to the large number of choices available to the programmer in programming the first and second programmable security connectors, the security of the enciphered clear text signal is maximized.

DESCRIPTION OF INTERFACE AND CONTROL CIRCUITS WITH OVERALL SYSTEMS OPERATION

ENCIPHER MODE — Referring to FIGS. 2, 3 an 4, the encipher mode is initiated with the control line designated ENC MODE is switched to the 1 (high) level. This control is connected to an input of NAND gates; 68, 70, 73, 89 and 94.

At the same time an INITIALIZING PULSE is fed to one input of NOR gate 93 and to the dominant set inputs of the flip-flop 164 of the Shuffle Register 160. This pulse sets the flip-flop 164 to the 1 state (SR1 OUT) while resetting all other bit positions of the Shuffle Register 160 to the 0 state.

The feedback path 5 of the P-Register (the path from the output of the EXCLUSIVE-OR gate 26 through NAND gates 28 and 32, to the input of shift register 12) is inhibited by the NAND gate 70 until the SYNC LOADED flip-flop 96 is set. The random 16-bit configuration contained in the P-Register is loaded serially into the Shuffle Register while being recirculated back into the P-Register. The sixteenth flip-flop output, from shift register 18, labeled P16, is fed to one input of NAND gate 73. The NAND gate 32 is conditioned to pass the output of NAND gate 73. Hence the state of P16 appears at the J and K inputs of the shift register 12. The P16 output is also fed to one input of NAND gate 63. The NAND gates 64, 89 and 92, following NAND gate 63, are conditioned to pass the state of P16 so that it appears at the inputs to flip-flop 164. The P-Register and the Shuffle Register 160 are clocked by their respective clocks, PR and SR. Since the flip-flop 164 was originally set to a 1, this bit, hereinafter called the sentinel bit, will be shifted one bit position with each successive SR CLOCK pulse until it arrives in bit position SR17. Immediately behind the sentinel bit will be the 16 bits that are contained in the P-Register. The 16 bits are clocked to the P16 line of the P-Register, through NAND gates 63, 64, 89 and 92 and flip-flop 164 to the J and K input terminals of the first shift register of the Shuffle Register. Simultaneously the 16 bits are re-loaded back into the P-Register through the path which includes NAND gates 73 and 32. This group of 16 bits is the "sync" data which will determine the starting point for the P-Register when the message about to be enciphered is later deciphered. The SR17 output going to the 1 state results in the SYNC LOADED flip-flop 96 being set to the "1" state through means of NAND gates 94 and 95. The flip-flop 96 will remain in the 1 state until reset by a RESET 1 pulse, which pulse will be generated after the clear text is completely enciphered.

The SYNC LOADED flip-flop 96 now inhibits NAND gates 70 and 73. This results in the feedback path 5 of the P-Register being enabled again. The NAND gate 63 is also inhibited at this time.

The DATA FLAG input line to NAND gate 62 is switched to the 1 level, enabling the gate to pass the output of the EXCLUSIVE-OR gate 60 wherein 40 bits of clear text is exclusive-ORed, bit by bit, with one of the three programmed non-linear pseudo-random bit sequences. The desired sequence (CODE A, CODE B, or CODE C) is selected by a 1 level on the appropriate SEL line to NAND gate 50, 51 or 52. The exclusive-ORed signal is loaded serially into the Shuffle Register behind the 16 sync bits. When forty bits of exclusive-ORed signal have been loaded, the sentinel bit will be present in the 57th bit position and the SR57 line will go high. A high or 1 signal on line SR57 results in the FULL flip-flop 66 being set.

The DATA FLAG into NAND gate 62 is switched to the 0 level, resulting in the output of NAND gate 64 being held at the 0 level. The PR CLOCK to the P-Register is turned off, halting the register. The Shuffle Register is clocked one more time with an SR CLOCK pulse. Since the FULL flip-flop 66 is in the 1 state during this clock, NAND gate 91 and the PE inputs to the Shuffle Register are conditioned for parallel loading the register and a bit interchange (Shuffle) occurs.

Following the single SR CLOCK pulse, the FULL flip-flop 66 is reset, and the Shuffle Register returns to the serial mode of operation. The 56 bits in the Shuffle Register represent a block of completely enciphered text ready for transmission to the CPU.

The SEND DATA line connected to one input of NAND gate 68 is switched to the 1 level, conditioning the gate for passing the enciphered text. The SR CLOCK to the Shuffle Register is turned on and 56 clock pulses are generated to serially shift the contents of the Shuffle Register out through NAND gate 68 and inverter 69 through output terminal 80 to the CPU.

The first block of enciphered text consists of 16 sync bits and 40 data bits. Once the random starting configuration of the P-Register is included in the first block of the enciphered text, the clear text can be recovered in the decipher operation. The blocks of enciphered message following the first block will then consist of 56 data bits.

Prior to enciphering each successive block of a message, an INITIALIZING PULSE is generated to set the first flip-flop of the Shuffle Register to the 1 state while resetting all other bit positions to the 0 state.

Fifty-six bits of clear text are exclusive-ORed with the next 56 bits of the non-linear bit train. The result is again loaded into the Shuffle Register, the bits are interchanged, and the enciphered text transmitted to the CPU.

After the last block of a message has been enciphered, a RESET 1 pulse is generated, and the ENC MODE control line is switched to the 0 level. The RESET 1 pulse resets the SYNC LOADED flip-flop 96 in preparation for enciphering a new message. The PR CLOCK free runs, stepping the P-Register through its maximal length sequence.

DECIPHER MODE — The decipher mode is initiated when the control line designated DEC MODE at the inputs to NAND gates 71, 72, 74, 85 and 88 is switched to the 1 level. At the same time an INITIALIZING PULSE is fed to one input of the NOR gate 93 and to the dominant set input S of flip-flop 164. This pulse sets the flip-flop 164 to the 1 state while resetting all other bit positions of the Shuffle Register to 0 state. The PR CLOCK to the P-Register is turned off, halting the register which had been free running. The P-Register feedback path 5 is inhibited by NAND gate 71 until the flip-flop 76 is set.

The first block of 56 enciphered bits is received at one input of the NAND gate 88 and is passed to the output of NAND gate 92. The output signal from NAND gate 92 is loaded, bit by bit, with successive SR CLOCK pulses, into the Shuffle Register. Since the flip-flop 164 was originally set to a 1 this sentinel bit will appear in the 57th bit position when the 56th bit is loaded into the Shuffle Register. The SR57 output will switch to the 1 state, resulting in the FULL flip-flop 66 being set. The Shuffle Register is clocked one more time with an SR CLOCK pulse. Since the FULL flip-flop is in the 1 state when this clock occurs, NAND gate 91 and the PE input to the Shuffle Register are conditioned for parallel loading the register and a bit interchange occurs. This operation places the 16 sync bits in the correct sequence for loading into the P-Register and unshuffles the remaining 40 data bits. The FULL flip-flop 66 also conditions NAND gate 77 such that its output switches to a 0 level, resetting the P-Register to all 0s. Following the single SR CLOCK pulse, the LOAD SYNC flip-flop 98 is set and the FULL flip-flop 66 is reset, returning the Shuffle Register to the serial mode of operation and switching the output of NAND gate 77 back to a 1 level. With the LOAD SYNC flip-flop 98 set, NAND gate 74 is conditioned to pass the state of SR57 through NAND gate 32 to the J and K inputs of register 12.

The P-Register and the Shuffle Register are clocked by their respective clocks, PR and SR. The SR57 output is loaded, bit by bit, into the P-Register. When the 16th sync bit is loaded into the P-Register, the sentinel bit will set the flip-flop 76 to the 1 state through NAND gates 72 and 75. This flip-flop will remain in the 1 state until reset by a RESET 1 pulse, which pulse will be generated after the enciphered message is completely deciphered. The P-Register now contains the same bit configuration it started at when the signal about to be deciphered was enciphered.

The flip-flop 76 now inhibits NAND gates 71 and 74. This results in the P-Register feedback path being enabled again. The forty bits of unshuffled enciphered text, from NAND gate 83, is exclusive-ORed, bit by bit, in the EXCLUSIVE-OR gate 84 with the same non-linear pseudo-random bit train originally used to encipher the data. The appropriate bit train (CODE A, CODE B or CODE C) is selected by a 1 level on one of the SEL lines to NAND gates 50, 51 and 52. Forty bits of completely deciphered text then appear at the output of inverter 86 after passing through NAND gate 85.

As explained in conjunction with the description of the encipher mode, all blocks after the first contain 56 data bits. No sync data is loaded from these blocks during decipher. Hence, after unshuffling the bits, the clear text is recovered by exclusive-ORing the SR56 output, not the SR57 output, with the next 56 bits of the non-linear bit train started with the first block. The NAND gates 81, 82 and 83 along with inverter 79 perform the necessary gating. During the first block the FIRST BLOCK control line connected to inverter 79 and NAND gate 82 will be at the 1 level.

This results in SR57 appearing at the output of NAND gate 83. During all subsequent blocks the FIRST BLOCK control line will be at a 0 level, resulting in SR56 appearing at the output of NAND gate 83. Prior to deciphering each block of a message, an INITIALIZING PULSE is generated to preset the Shuffle Register to all 0s except for the sentinel bit in the first position.

After the last block of a message has been deciphered, a RESET 1 pulse is generated, and the DEC MODE control line is switched to the 0 level. The RESET 1 pulse resets the flip-flop 76 in preparation for deciphering the first block of a new message. The PR CLOCK free runs, stepping the P-Register through its maximal length sequence.

Referring to FIG. 5, the programmable cryptic device 20 is shown mounted on a plug-in type board 30. The locations of the four major sections, P-Register, Shuffle Register, Non-Linear Logic and Interface and Control Circuits are shown. The complete first programmable security connector 151 is shown along with the receptacle portion 154 of the second security connector. The layout shown in FIG. 5 is by way of example only and is not to be construed in any limiting sense.

While there has been shown what is considered to be the preferred embodiment of the present invention, it will be manifest that many changes and modifications may be made therein without departing from the essential spirit of the invention. It is intended, therefore, in the annexed claims, to cover all such changes and modifications as fall within the true scope of the invention.

What is claimed is:

1. An encryptor for encoding a string of data bits comprising in combination:
    a. register means for generating a pseudo-random bit sequence;
    b. non-linear generator means comprising logic means for sequentially receiving portions of the pseudo-random bit sequence and for logically combining bits from the portions of the received pseudo-random bit sequence to provide a plurality of combined bit signals, and parity generator means connected to receive said plurality of combined bit signals for providing said non-linear pseudo-random bit sequence with each bit of said sequence being indicative of the parity of the plurality of combined bit signals;

c. combining means for combining the data bits of said string of data bits with bits of said non-linear pseudo-random bit sequence to provide a partially encoded signal; and d. shuffle means for receiving said partially encoded signal and for shuffling the bit positions of said partially encoded signal to provide an encoded signal.

2. The encrypter according to claim 1 wherein said register means is comprised of:

a. a multiple stage shift register; and b. feedback means for combining the output of selected stages of said shift register and for feeding said combined output back to the input of said shift register.

3. The encrypter according to claim 1 wherein said shuffle means is comprised of:

a. a multiple stage shift register each stage of which has an input and an output terminal; and b. programming means for selectively connecting the input terminal of selected stages to the output terminal of selected stages so as to shuffle the bit positions of said partially encoded signal.

4. A cryptic device for encoding a string of data bits comprising in combination:

a. a multi-stage shift register;

b. feedback means for combining the outputs of selected stages of said shift register and for feeding the combined outputs back to the input of said shift register;

c. a plurality of non-linear logic means comprising; a plurality of logic gates corresponding in number to one-half the plurality of inputs to a non-linear logic means, each of said logic gates having an output and at least first and second inputs, the first input of each of said plurality of logic gates being input to said non-linear logic means; a plurality of inverters corresponding in number to said plurality of logic gates, each having an input and and output, the output of each inverter connected to said second input of an associated logic gate with the input of each of said inverters being an input to said non-linear logic means; a parity generator receiving as inputs the outputs from said plurality of logic gates for providing a combined output signal indicative of the parity of the outputs from said plurality of logic gates;

d. programmable means for connecting the outputs of selected stages of said multi-stage shift register to selected inputs of said plurality of non-linear logic means;

e. means for logically combining the string of data bits with the combined output of a selected one of said plurality of non-linear logic means to provide a partially encoded data bit signal; and f. shuffle means for sequentially receiving blocks of the partially encoded data bit signal and for programmably shuffling the data bit positions within each of the sequentially received blocks of data bits to provide a fully encoded data bit string.

5. The cryptic device according to claim 4 wherein said means for logically combining is an EXCLUSIVE-OR gate having one input connected to receive said string of serial data and another input connected to receive a combined output from a selected one of said plurality of non-linear logic means so as to provide as an output said partially encoded data bit signal.

6. The cryptic device according to claim 4 wherein said shuffle means is comprised of:

a multiple stage shift register each stage of which has an input and an output terminal; and programming means for selectively connecting the input terminals of selected stages to the output terminals of selected stages so as to shuffle the data bit positions within each of the sequentially received blocks of data bits to provide said fully encoded data bit string.

* * * * *